United States Patent
Cha et al.

(10) Patent No.: US 8,917,377 B2
(45) Date of Patent: Dec. 23, 2014

(54) ACTIVE LENSES, STEREOSCOPIC IMAGE DISPLAY APPARATUSES INCLUDING ACTIVE LENSES AND METHODS OF OPERATING THE SAME

(75) Inventors: Seung-nam Cha, Seoul (KR); Sun-il Kim, Seoul (KR); Yong-kweun Mun, Yongin-si (KR); Jae-eun Jang, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 763 days.

(21) Appl. No.: 12/805,747

(22) Filed: Aug. 18, 2010

(65) Prior Publication Data

US 2011/0096250 A1  Apr. 28, 2011

(30) Foreign Application Priority Data

Oct. 22, 2009  (KR) .................. 10-2009-0100770
Feb. 9, 2010  (KR) .................. 10-2010-0012032

(51) Int. Cl.
| | | |
|---|---|---|
| *G02F 1/13* | (2006.01) | |
| *G02F 1/1335* | (2006.01) | |
| *G02B 26/08* | (2006.01) | |
| *H04N 13/04* | (2006.01) | |
| *G02B 27/22* | (2006.01) | |
| *G02B 3/00* | (2006.01) | |
| *G02F 1/29* | (2006.01) | |

(52) U.S. Cl.
CPC ............. *G02F 1/29* (2013.01); *G02F 2202/36* (2013.01); *G02F 1/133526* (2013.01); *G02B 3/0006* (2013.01); *G02F 1/1323* (2013.01); *G02B 26/0875* (2013.01); *G02F 2001/294* (2013.01); *H04N 13/0404* (2013.01); *G02B 27/2214* (2013.01)
USPC .............. 349/200; 349/15; 997/932; 997/952

(58) Field of Classification Search
USPC ...................................... 349/15, 200
See application file for complete search history.

(56) References Cited

U.S. PATENT DOCUMENTS

| | | | |
|---|---|---|---|
| 7,697,109 B2 | 4/2010 | Yun et al. | |
| 7,811,667 B2 * | 10/2010 | Shin et al. | 428/408 |
| 2007/0008617 A1 | 1/2007 | Shestak et al. | |

(Continued)

FOREIGN PATENT DOCUMENTS

| | | |
|---|---|---|
| JP | 2002-035780 | 2/2002 |
| JP | 2005-326825 | 11/2005 |

(Continued)

OTHER PUBLICATIONS

Search Report dated Feb. 4, 2011 issued by the European Patent Office for Application No. 10187605.0.

(Continued)

*Primary Examiner* — Dennis Y Kim
(74) *Attorney, Agent, or Firm* — Harness, Dickey & Pierce, P.L.C.

(57) ABSTRACT

An active lens includes: a first nanoelectrode unit; a second nanoelectrode unit formed to face the first nanoelectrode unit; and a liquid crystal layer disposed between the first nanoelectrode unit and the second nanoelectrode unit. Liquid crystal molecules of the liquid crystal layer are aligned according to an electric field formed by a voltage applied to the first and second nanoelectrode units to form a refractive power.

37 Claims, 9 Drawing Sheets

(56) References Cited

U.S. PATENT DOCUMENTS

| | | |
|---|---|---|
| 2007/0115413 A1* | 5/2007 | Liu et al. ............... 349/123 |
| 2008/0013002 A1 | 1/2008 | Hong et al. |
| 2008/0252720 A1 | 10/2008 | Kim et al. |
| 2010/0208152 A1 | 8/2010 | Kim et al. |

FOREIGN PATENT DOCUMENTS

| | | |
|---|---|---|
| JP | 2006-126721 A | 5/2006 |
| JP | 2007-226231 | 9/2007 |
| JP | 2009-229521 A | 10/2009 |
| KR | 10-2008-0001141 | 1/2008 |
| KR | 10-2008-0092625 | 10/2008 |
| WO | WO 2007/099488 | 9/2007 |
| WO | WO-2008/131304 A1 | 10/2008 |
| WO | WO 2008/155563 | 12/2008 |

OTHER PUBLICATIONS

Rajasekharan-Unnithan, R. "Optical phase modulation using a hybrid carbon nanotube-liquid-crystal nanophotonic device", Optics Letters, vol. 34, No. 8, Apr. 15, 2009.

T.D. Wilkinson, et al., "Patterned multiwall carbon nanotube electrode arrays for liquid crystal photonic devices," Proc. of SPIE vol. 6988, pp. 1-8 (2008).

Japanese Office Action issued in Japanese Patent Application No. 2010-235484, dated Jul. 15, 2014.

* cited by examiner

ACTIVE LENSES, STEREOSCOPIC IMAGE DISPLAY APPARATUSES INCLUDING ACTIVE LENSES AND METHODS OF OPERATING THE SAME

CROSS-REFERENCE TO RELATED APPLICATIONS

This application claims priority under 35 U.S.C. §119 to Korean Patent Application No. 10-2009-0100770, filed on Oct. 22, 2009, and Korean Patent Application No. 10-2010-0012032, filed on Feb. 9, 2010, in the Korean Intellectual Property Office. The entire contents of each of these applications are incorporated herein by reference.

BACKGROUND

1. Field

Example embodiments relate to active lenses and stereoscopic image display apparatuses including the same.

2. Description of the Related Art

Refractive indices of liquid crystal molecules vary according to their alignment states because the refractive index in the major axis direction is generally different from the refractive index in the minor axis direction. In one example, if a boundary where the refractive index changes is curved, the liquid crystal molecules refract transmitted light, thereby acting as an optical lens. Moreover, liquid crystal molecules align along the direction of the electric field, and thus, the refractive indices may be aligned according to an electric field.

A carbon nanotube is a cylindrical crystal composed of carbon atoms and having a nano-sized diameter. Carbon nanotubes are categorized as single-walled carbon nanotubes or multi-walled carbon nanotubes according to the number of planes of the cylinder. Also, carbon nanotubes may act as conductors or semi-conductors according to the diameter or the structure of the cylindrical plane. Thus, carbon nanotubes have been highlighted as a next-generation material. In addition, carbon nanotubes have superior properties to many other materials, and thus, are expected to be used relatively widely in semiconductor devices, secondary battery electrodes, sensors, electron emission devices, supercapacitors, etc.

SUMMARY

Example embodiments provide active lenses having controllable optical properties (e.g., refractive indices). Example embodiments also provide stereoscopic image display apparatuses including active lenses having controllable optical properties. According to at least some example embodiments, the stereoscopic image display apparatuses may be auto-stereoscopic (or non-glasses-type stereoscopic) image display apparatuses.

At least one example embodiment provides an active lens. According to at least this example embodiment, the active lens includes: a first substrate on which a first nanoelectrode unit is formed; a second substrate on which a second nanoelectrode unit is formed to face the first nanoelectrode unit; and a liquid crystal layer disposed between the first substrate and the second substrate. The liquid crystal layer includes liquid crystal molecules, which are aligned to form a refractive power. The liquid crystal molecules are aligned according to an electric field formed by a voltage or voltages applied to the first and second nanoelectrode units.

At least one other example embodiment provides an active lens. According to at least this example embodiment, the active lens includes: a first nanoelectrode unit; a second nanoelectrode unit formed to face the first nanoelectrode unit; and a liquid crystal layer disposed between the first nanoelectrode unit and the second nanoelectrode unit. The liquid crystal layer includes liquid crystal molecules, which are aligned to form a refractive power. The liquid crystal molecules are aligned according to an electric field formed by a voltage or voltages applied to the first and second nanoelectrode units.

According to at least some example embodiments, the first nanoelectrode unit may include one or more first nanostructures and the second nanoelectrode unit may include one or more second nanostructures. To form one or more lens cells, each of the one or more first nanostructures may correspond to one or more of the second nanostructures. In one example, each second nanostructure may be formed to be aligned or in line with a corresponding first nanoelectrode structure. Alternatively, the one or more first nanostructures and the one or more second nanostructures may be arranged alternately or offset relative to one another. In this case, each second nanostructure may not be aligned with a corresponding one of the first nanostructures. The one or more first nanostructures may face the one or more second nanostructures.

According to at least some example embodiments, the first nanoelectrode unit may include a plurality of first nanostructures and the second nanoelectrode unit may include a plurality of nanoelectrode groups. Each of the plurality of nanoelectrode groups may include a plurality of second nanostructures. Each of the plurality of first nanostructures may correspond to a nanoelectrode group to form a plurality of lens cells.

The directivity of the lens cells may be adjusted by selectively applying a voltage or voltages to the first and second nanostructures.

According to at least some example embodiments, the active lens may further include: a control unit configured to time-sequentially change the directivity of the corresponding lens cell by selectively applying a voltage or voltages to the first and second nanostructures.

Each of the plurality of nanoelectrode groups may include a central second nanostructure aligned or in line with a corresponding one of the first nanostructures, and a plurality of second nanostructures that surround the central second nanostructure.

The first and second nanostructures may be comprised of at least one selected from the group including carbon nanotubes, gold nanowires, zinc oxide (ZnO) nanowires, silicon (Si) nanowires or the like.

The first and second nanostructures may be nanowalls or form as fins.

At least one other example embodiment provides a stereoscopic image display apparatus. According to at least this example embodiment, the stereoscopic image display apparatus includes: a display panel configured to time-sequentially display a plurality of images with different view points; an active lens; and a control unit. The active lens includes: a first substrate on which a first nanoelectrode unit is formed; a second substrate on which a second nanoelectrode unit is formed to face the first nanoelectrode unit; and a liquid crystal layer disposed between the first substrate and the second substrate. The liquid crystal layer includes liquid crystal molecules. The liquid crystal molecules are aligned to form a refractive power according to an electric field generated by voltage or voltages applied to the first and second nanoelectrode units. The control unit is configured to control the voltage or voltages applied to the first and second nanoelectrode units such that a directivity of the active lens is changed towards visual fields corresponding to the plurality of images in synchronization with the time-sequential operation of the display panel.

At least one other example embodiment provides a stereoscopic image display apparatus. According to at least this example embodiment, the stereoscopic image display apparatus includes: a display panel configured to time-sequentially display a plurality of images with different view points; an active lens; and a control unit. The active lens includes: a first nanoelectrode unit; a second nanoelectrode unit facing the first nanoelectrode unit; and a liquid crystal layer disposed between the first nanoelectrode unit and the second nanoelectrode unit. The liquid crystal layer includes liquid crystal molecules. The liquid crystal molecules are aligned to form a refractive power according to an electric field generated by a voltage or voltages applied to the first and second nanoelectrode units. The control unit is configured to control the voltage or voltages applied to the first and second nanoelectrode units such that a directivity of the active lens is changed in synchronization with the time-sequential operation of the display panel.

According to at least some example embodiments, each of the first nanoelectrode unit may include one or more first nanostructures and the second nanoelectrode unit may include one or more second nanostructures. To form a plurality of lens cells, the one or more first nanostructures may be formed to correspond to the one or more second nanostructures. The one or more first nanostructures may be formed to face the one or more second nanostructures. In one example, each of the second nanostructures may be aligned or in line with a corresponding one of the first nanostructures. Alternatively, the first and second nanostructures may not be aligned or in line with one another. In this case, the first and second nanostructures may be horizontally offset from one another.

The first nanoelectrode unit may include a plurality of first nanostructures and the second nanoelectrode unit may include a plurality of nanoelectrode groups. Each of the plurality of nanoelectrode groups may include a plurality of second nanostructures. To form a plurality of lens cells having directivity, each of the plurality of first nanostructures corresponds to at least a portion of the plurality of second nanostructures of each of the plurality of nanoelectrode groups.

Each of the plurality of nanoelectrode groups may include a central second nanostructure that is aligned or in line with a corresponding one of the first nanostructures, and a plurality of second nanostructures surrounding the central second nanostructure.

The plurality of first nanostructures and the plurality of second nanostructures may be comprised of at least one selected from the group including carbon nanotubes, gold nanowires, ZnO nanowires, Si nanowires or the like.

At least one other example embodiment provides a method of operating an active lens. According to at least this example embodiment, an alignment of liquid crystal molecules of a liquid crystal layer is controlled to generate a refractive power by generating an electric field in the liquid crystal layer. The electric field is generated by applying one or more voltages to first and second nanoelectrode units arranged on opposite surfaces of the liquid crystal layer.

At least one other example embodiment provides a method of operating a stereoscopic image display apparatus including an active lens. According to at least this example embodiment, the method includes: time-sequentially displaying a plurality of images with different view points; and controlling a directivity of the active lens in synchronization with the time-sequential display by applying one or more voltages to first and second nanoelectrode units arranged on opposite surfaces of a liquid crystal layer. The one or more applied voltages generate an electric field in the liquid crystal layer, and the electric field controls an alignment of liquid crystal molecules of the liquid crystal layer to generate a refractive power.

According to at least some example embodiments, the first nanoelectrode unit may include a plurality of first nanostructures, and the second nanoelectrode unit may include a plurality of second nanostructures. A first voltage applied to each of the first nanostructures may be different from a second voltage applied to a corresponding one of the second nanostructures.

A different first voltage may be applied to each of the first nanostructures, and the magnitude of the first voltages may gradually increase in a first direction. A different second voltage may be applied to each of the second nanostructures, and the magnitude of the second voltages may increase in the first direction. A difference between the first voltages applied to adjacent ones of the plurality of first nanostructures and a difference between the second voltages applied to adjacent ones of the plurality of second nanostructures may be constant.

A directivity of the active lens may be adjusted by selectively applying the one or more voltages to the plurality of second nanostructures.

The directivity of the active lens may be time-sequentially changed in synchronization with images displayed by a display panel.

BRIEF DESCRIPTION OF THE DRAWINGS

Example embodiments will become more apparent and readily appreciated from the following description of the accompanying drawings in which.

DETAILED DESCRIPTION

Figure 1:
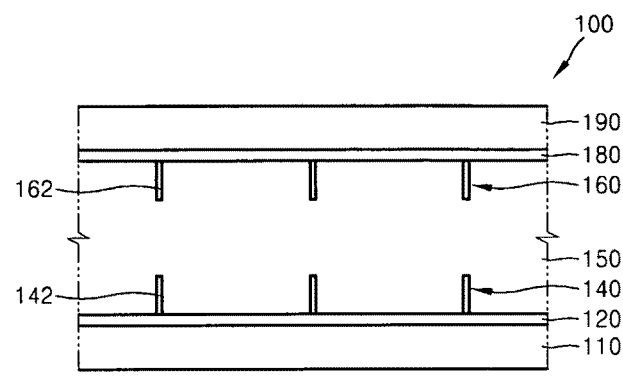
FIG. 1 is a schematic diagram of an active lens according to an example embodiment.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

It should be understood, however, that there is no intent to limit example embodiments to the particular embodiments disclosed, but on the contrary example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic diagram of an active lens 100 according to an example embodiment.

Referring to FIG. 1, the active lens 100 includes: a first nanoelectrode unit 140 formed on a first substrate 110; a second nanoelectrode unit 160 formed on a second substrate 190; and a liquid crystal layer 150 disposed between the first substrate 110 and the second substrate 190. The second nanoelectrode unit 160 is formed on a surface of the second substrate 190 facing the first nanoelectrode unit 140 such that the first nanoelectrode unit 140 and the second nanoelectrode unit 160 are arranged at opposite sides of the liquid crystal layer. The first nanoelectrode unit 140 includes a plurality of first nanostructures 142, and the second nanoelectrode unit 160 includes a plurality of second nanostructures 162. In the example shown in FIG. 1, each of the plurality of first nanostructures 142 is aligned or in line with a corresponding one of the plurality of second nanostructures 162.

The liquid crystal layer 150 is composed of liquid crystal molecules. The liquid crystal molecules may be aligned according to an electric field. The electric field may be generated by applying a voltage or voltages to the first and second nanoelectrode units 140 and 160. The liquid crystal molecules may be aligned such that the liquid crystal layer 150 has a desired refractive power.

Although a plurality of first nanostructures 142 and a plurality of second nanostructures 162 are shown in FIG. 1, the first nanoelectrode unit 140 may include one or more (at least one) first nanostructures 142 and the second nanostructure unit 160 may include one or more second nanostructures 162.

The first and second nanostructures 142 and 162 may be comprised of carbon nanotubes. As mentioned above, a carbon nanotube is a cylindrical crystal composed of carbon atoms and having a nano-sized diameter. Carbon nanotubes may be conductive or semi-conductive according to the diameter or the structure of cylindrical surface. The carbon nanotubes may be synthesized using generally known methods, such as an arc discharge method, a laser deposition method, a thermal chemical vapor deposition (thermal CVD) method, a catalytic CVD method, a plasma enhanced CVD method, or the like. Carbon nanotubes may be grown in the form of a single-walled carbon nanotubes or multi-walled carbon nanotubes, which are categorized according to the number of surfaces of the cylinder. According to at least one example embodiment, carbon nanotubes are used to enhance field effects, which form a greater electric field in response to a smaller applied voltage. As a result, the carbon nanotubes may be multi-walled carbon nanotubes, which have a higher conductivity than single-walled carbon nanotubes.

The first and second nanostructures 142 and 162 may also be nanowires having a relatively high aspect ratio and which are formed of a conductor or semiconductor material. For example, the first and second nanostructures 142 and 162 may be gold nanowires, zinc oxide (ZnO) nanowires, silicon (Si) nanowires, or the like. Alternatively, the nanostructures 142 and 162 may be nanowalls or formed as fins.

In the example embodiment shown in FIG. 1, each of the first nanostructures 142 is formed to correspond to a corresponding one of the second nanostructures 162 to form a single lens cell. But, the number of lens cells shown in FIG. 1 is for illustrative purposes only. According to example embodiments, a single lens cell or a plurality of lens cells may be formed. And, the lens cells may be formed in a one-dimensional array or a two-dimensional array. As illustrated in FIG. 1, the first nanostructures 142 and the second nanostructures 162 unit 160 may be arranged in parallel with one another and to face each other such that each second nanostructure 162 is aligned with a second nanostructure 142.

Still referring to FIG. 1, the first and second substrates 110 and 190 may be formed of a transparent material. A first transparent electrode layer 120 is formed on a surface of the first substrate 110 between the first substrate 110 and the first nanostructures 142. A second transparent electrode layer 180 is formed on a surface of the second substrate 190 between the second substrate 190 and the second nanostructures 162. The transparent electrode layers 120 and 180 are configured to apply a voltage or voltages to the first and second nanostructures 142 and 162. Although not illustrated, an alignment layer may also be included for initial alignment of the liquid crystal layer 150.

Figure 2:
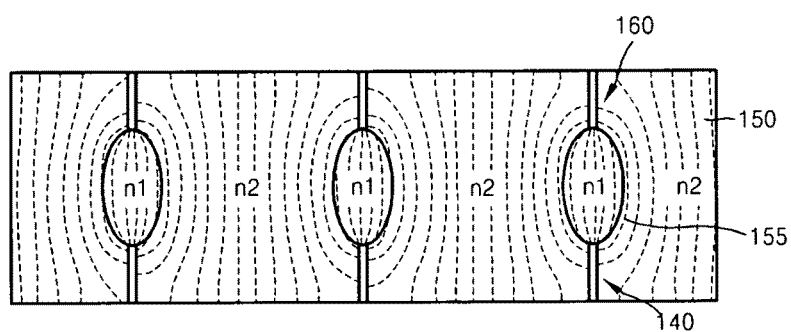
FIG. 2 is a concept drawing illustrating an example equivalent surface of the active lens of FIG. 1.

FIG. 2 is a concept drawing illustrating an example equivalent lens surface 155 of the active lens 100 of FIG. 1.

Referring to FIG. 2, the equivalent lens surface is formed according to an electric field distribution. When the liquid crystal molecules are aligned according to an electric field, the active lens 100 has a refractive power. For liquid crystal molecules (not shown) of the liquid crystal layer 150, the refractive index in the major axis direction is different from the refractive index in the minor axis direction. When a voltage is applied to the first nanostructures 142 and the second nanostructures 162, an electric field denoted by the dotted line in FIG. 2 is formed in the liquid crystal layer 150. The liquid crystal molecules are aligned along the direction of the electric field.

Depending on the type of liquid crystal molecules, the major axis direction or the minor axis of the liquid crystal molecules is aligned in parallel with the electric field. For example, if the liquid crystal molecules are P-type liquid crystals, the major axis of the liquid crystal molecules is aligned in parallel with the electric field. If the liquid crystal molecules are N-type liquid crystals the minor axis is aligned in parallel with the electric field. However, not all of the liquid crystal molecules in the electric field are aligned along the direction of electric field. Rather, only liquid crystal molecules disposed within an electric field greater than a given, desired or predetermined value are aligned along the direction of the electric field. Thus, the liquid crystal molecules constituting the liquid crystal layer 150 are divided into liquid crystal molecules aligned along the direction of electric field and liquid crystal molecules aligned in the initial direction.

Because the refractive index of the liquid crystal molecules in the major axis direction is different from the refractive index in the minor axis direction, the liquid crystal molecules aligned along the direction of electric field have a refractive index n1, whereas the liquid crystal molecules that are aligned in the original direction have a refractive index n2. A boundary forms between the different refractive indices. The boundary has a curvature determined by the electric field distribution, thereby generating a refractive power.

The shape of the equivalent lens surface 155 of the active lens 100 illustrated in FIG. 2 is for illustrative purposes only. According to example embodiments, the equivalent lens surface may be an oval shape, a circular shape, etc. based on the electric field distribution.

The voltage or voltages applied to the nanostructures 142 and 162 may be adjusted to form various electric field distributions. As a result, the refractive power of the active lens 100 may be adjusted accordingly.

Figure 3A:
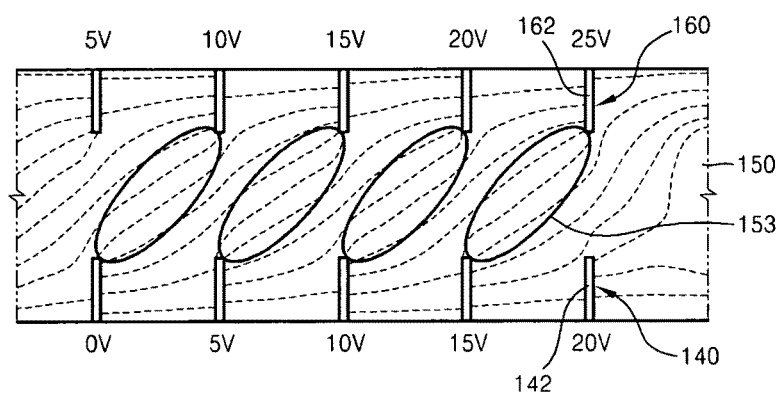
FIGS. 3A and 3B are diagrams respectively illustrating example embodiments of electric field distributions and corresponding lens surfaces when a voltage or voltages applied to the nanostructures of each nanoelectrode unit in FIG. 1 vary.
Figure 3B:
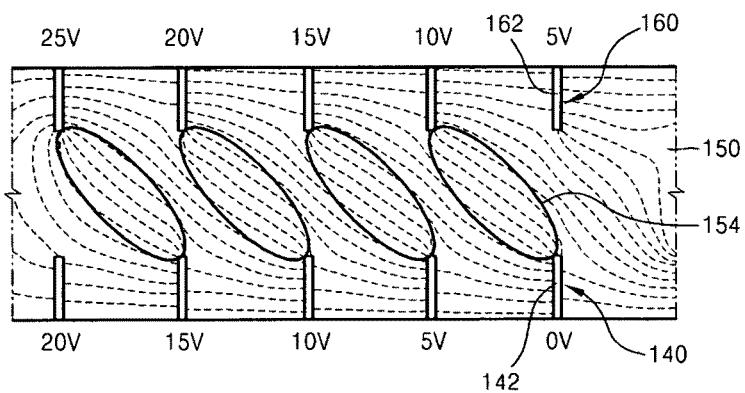

FIGS. 3A and 3B are diagrams illustrating an example electric field distribution resulting from multiple voltages being applied to the active lens of FIG. 1. FIGS. 3A and 3B also show example equivalent lens planes formed according to the electric field distribution.

Referring to FIGS. 3A and 3B, the voltage applied to each of the first nanostructures 142 is different from the voltage applied to a corresponding one of the second nanostructures 162. Unlike the structure illustrated in FIG. 2, the equivalent lens surfaces shown in FIGS. 3A and 3B have directivity.

For example, in FIG. 3A, the voltages applied to the plurality of first nanostructures 142 increase in one direction (e.g., from left to right in FIG. 3A). Similarly, the voltages applied to each of the second nanostructures 162 increase in the same direction (e.g., from left to right in FIG. 3A). In each case, the voltages increase gradually from one nanostructure to the next adjacent nanostructure. As mentioned above, however, the voltages applied to corresponding first and second nanostructures are different. When voltages are applied as shown in FIG. 3A, the liquid crystal molecules of the liquid crystal layer 150 are aligned along the direction of an electric field indicated by the dotted lines, which denote the electric force.

In FIG. 3A, a portion of the liquid crystal molecules of the liquid crystal layer 150 are aligned along the direction of the electric field, whereas a portion of the liquid crystal molecules are aligned in the initial direction. The boundary surfaces between these liquid crystal molecules form inclined equivalent lens surfaces 153. This inclination converts an optical axis of incident light.

Referring to FIG. 3B, the voltages applied to each of the first nanostructures 142 also increase in one direction (e.g., from right to left in FIG. 3B). Similarly, the voltages applied to each of the second nanostructures 162 increase in the same direction (e.g., from right to left in FIG. 3B). In each case, the voltages increase gradually from one nanostructure to the next adjacent nanostructure. When a voltage is applied as shown in FIG. 3B, the liquid crystal molecules of the liquid crystal layer 150 are aligned along the direction of the electric field indicated by the dotted line. According to the applied voltages in FIG. 3B, the equivalent lens surfaces 154 are formed at an incline, which converts an optical axis of light incident to the liquid crystal layer 150.

In FIGS. 3A and 3B, the voltage applied to a second nanostructure 162 is higher than the voltage applied to a corresponding first nanostructure 142. The directivity of the equivalent lens surface changes from the equivalent lens surface of FIG. 3A to the equivalent lens surface of FIG. 3B based on the direction in which the applied voltages increase. However, structures forming the equivalent lens surface as FIG. 3B are not limited thereto, and other structures forming the same or substantially the same equivalent lens surfaces are possible. For example, if the voltages applied to the first nanostructures 142 and the second nanostructures 162 increase from left to right as shown in FIG. 3A, but the voltage applied to the first nanostructures 142 is higher than the voltage applied to each corresponding second nanostructure 162, then the directivity of the resultant equivalent lens surfaces is as shown in FIG. 3B. In addition, in FIGS. 3A and 3B, the difference between the voltages applied to the first nanostructures 142 and the voltages applied to the corresponding second nanostructures 162 is equal or substantially equal to about 5 V. But, example embodiments are not limited thereto. For example, the difference between the voltages may be varied to adjust the directivity of the equivalent lens planes.

Figure 4:
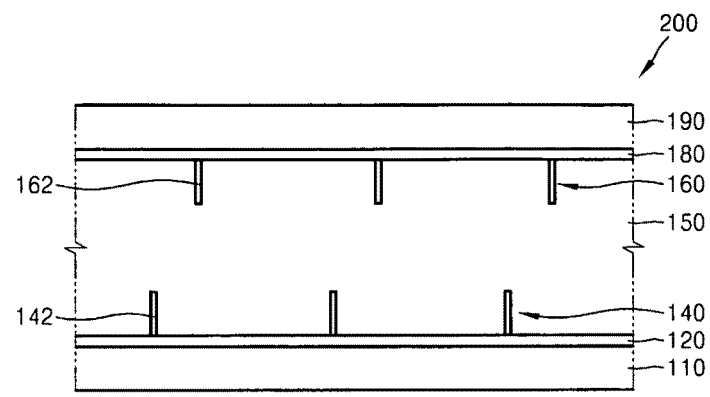
FIG. 4 is a schematic diagram of an active lens according to another example embodiment.
Figure 5:
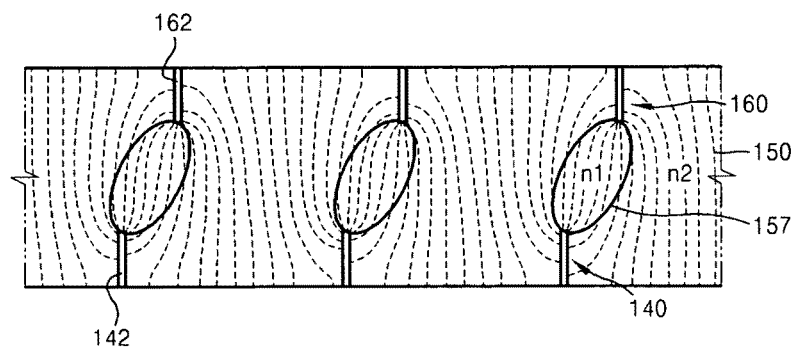
FIG. 5 is a concept drawing illustrating an example equivalent plane of the active lens of FIG. 4.

FIG. 4 is a schematic diagram of an active lens 200 according to another example embodiment. FIG. 5 is a concept drawing illustrating example equivalent lens planes 157 of the active lens 200 of FIG. 4. The equivalent lens surfaces 157 are formed according to an electric field distribution.

Referring to FIGS. 4 and 5, the first nanostructures 142 of the first nanoelectrode unit 140 and the second nanostructures 162 of the second nanoelectrode unit 160 are alternately arranged. In this example, the first nanostructures 142 and corresponding second nanostructures 162 are arranged offset from one another such that the second nanostructures 162 are not aligned with corresponding ones of the first nanostructures 142. The arrangement shown in FIGS. 4 and 5 forms a lens surface with directivity allowing change of an optical axis of incident light. In this example embodiment, a portion of the liquid crystal molecules of the liquid crystal layer 150 are aligned along a direction of an electric field formed by a voltage applied to the first and second nanostructures 142 and 162. These liquid crystal molecules have a refractive index n1. Another portion of the liquid crystal molecules are aligned in the initial direction, and have a refractive index n2. The equivalent lens surfaces 157 are formed by the boundaries between the liquid crystal molecules having the refractive index n1 and the liquid crystal molecules having the refractive index n2. In one example, the equivalent lens surfaces 157 are inclined to the right as illustrated in FIG. 5.

Figure 6:
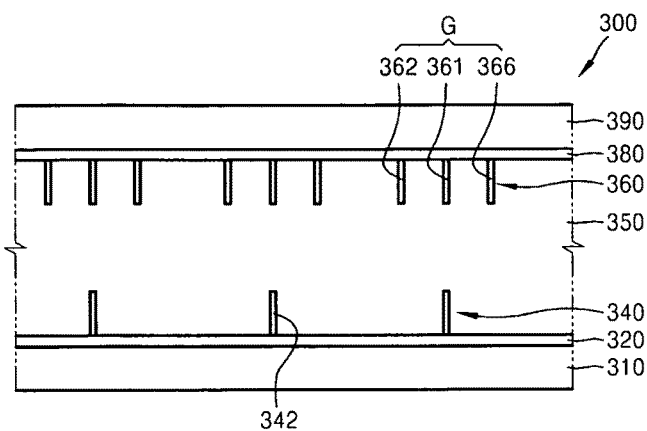
FIG. 6 is a schematic diagram of an active lens according to another example embodiment.
Figure 7:
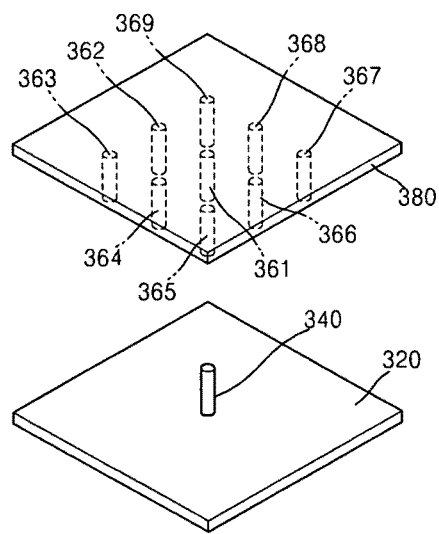
FIG. 7 is a partial perspective view illustrating an example embodiment of a structure of a nano-electrode group shown in FIG. 6.

FIG. 6 is a schematic diagram of an active lens 300 according to another example embodiment. FIG. 7 is a partial perspective view illustrating a structure of a nano-electrode group G of FIG. 6 according to an example embodiment.

Referring to FIG. 6, the active lens 300 includes a first nanoelectrode unit 340 formed on a first substrate 310; a second nanoelectrode unit 360 formed on a second substrate 390; and a liquid crystal layer 350 disposed between the first substrate 310 and the second substrate 390. The first nanoelectrode unit 340 and the second nanoelectrode unit 360 face one another.

The first nanoelectrode unit 340 includes a plurality of first nanostructures 342 that are vertically grown. The second nanoelectrode unit 360 includes a plurality of nanoelectrode groups G. Each of the nanoelectrode groups G includes a plurality of second nanostructures 361-369 (hereinafter, the nanostructure 361 is referred to as "central second nanostructure 361") that are vertically grown. In this example, this structure forms a lens cell array with adjustable directivity. Each of the first nanostructures 342 corresponds to a nanoelectrode group G to form a plurality of lens cells. An equivalent lens surface tilted in one direction is formed by selectively applying a voltage to only a portion of the second nanostructures 361-369 included in the nanoelectrode group G.

The first and second substrates 310 and 390 may be formed of a transparent material. A transparent electrode layer 320 is formed on a surface of the first substrate 310 between the first substrate 310 and the first nanostructures 342. The transparent electrode layer 320 is used to apply a voltage to the first nanostructures 342. A TFT layer 380 is formed on a surface of the second substrate 390 between the second substrate 390 and the nanoelectrode groups G. The TFT layer 380 is used to individually apply a voltage to each of the nanostructures 361-369 of the nanoelectrode groups G. In addition, although not illustrated, an alignment layer for initial alignment of the liquid crystal layer 350 may be included.

Referring to FIG. 7, each nanoelectrode group G includes a central second nanostructure 361 that faces a corresponding first nanostructure 342 in a straight or substantially straight line. In this example, the central second nanostructure 361 is spatially aligned with the corresponding first nanostructure. A plurality of second nanostructures 362-369 surround the central second nanostructure 361 in the front, rear, left, and right. The arrangement of the nanostructures 361-369 is for illustrative purposes only. Various arrangements enabling changes in directivity of the lens surface by selectively applying a voltage to some of the nanostructures are possible.

Figure 8A:
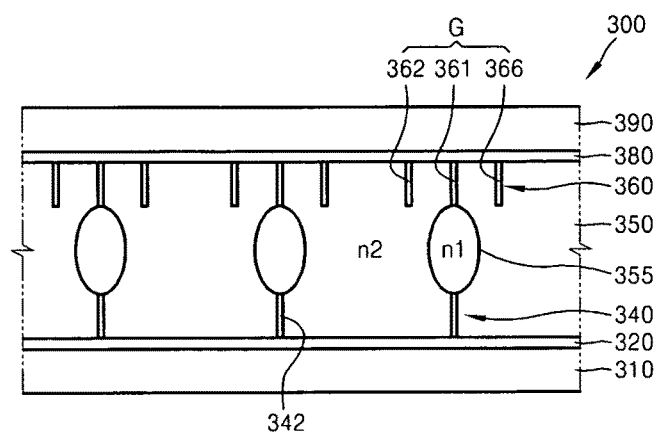
FIGS. 8A through 8C are views illustrating various example equivalent lens surfaces formed according to a voltage or voltages applied to the nano-electrode group shown in FIG. 6.
Figure 8B:
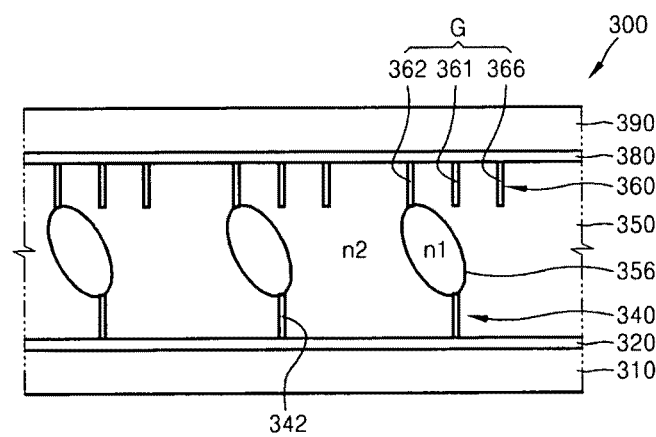
Figure 8C:
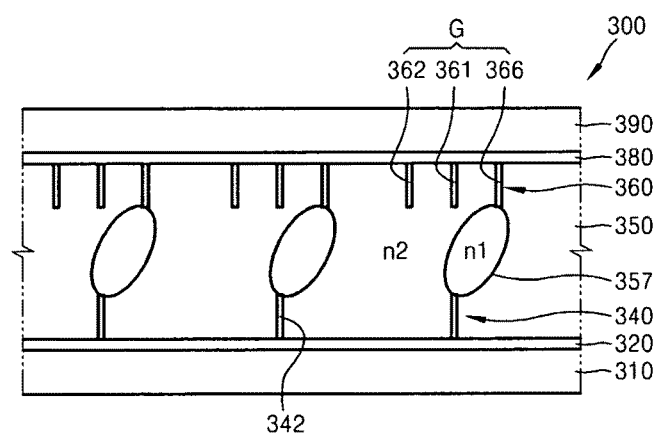

FIGS. 8A through 8C are views illustrating various example equivalent lens surfaces formed according to a voltage applied to the nano-electrode groups G of FIG. 6.

In FIG. 8A, a voltage is applied to the first nanostructures 342 and the central second nanostructures 361. In this example, equivalent lens planes 355 that are formed according to an electric field distribution are top and bottom symmetrical with respect to each other, and thus do not change an optical axis of light incident through the first substrate 310. Moreover, the equivalent lens planes 355 have an optical axis perpendicular to a surface of the first substrate 310.

In FIG. 8B, a voltage is applied to the first nanostructures 342 and the second nanostructures 362, which are arranged at a left side of the central second nanostructures 361. In this example, the electric field distribution formed according to the applied voltage forms equivalent lens surfaces 356 that are tilted to the left. The equivalent lens surfaces 356 have a directivity that changes an optical axis of incident light, which has an optical axis perpendicular to the surface of the first substrate 310, to the right.

In FIG. 8C, a voltage is applied to the first nanostructures 342 and the second nanostructures 366, which are arranged at a right side of the central second nanostructures 361. The electric field distribution formed according to the structure of the applied voltage forms equivalent lens surfaces 357 that are tilted to the right. In this example, the equivalent lens surfaces 357 have a directivity that changes an optical axis of incident light, which has an optical axis perpendicular to the surface of the first substrate 310, to the left.

As described above, a voltage may be selectively applied to a portion of the nanostructures 361-369 of the nanoelectrode group G to adjust the directivity of the corresponding lens cell. Although only the cases of changing the directivity to the left or the right are illustrated, a voltage may be selectively applied to any of the second nanostructures 361-369 to change the directivity to the front, rear, or other directions, and one or more of the second nanostructures 361-369 may be selected.

In addition, the active lens 300 may further include a control unit. The control unit may be configured to control the selective application of voltages to the second nanostructures 361-369 to time-sequentially change the directivity of the corresponding lens cell.

The above-described active lenses may be used in stereoscopic image display devices such as auto-stereoscopic (or non-glasses-type) image display devices.

Figure 9:
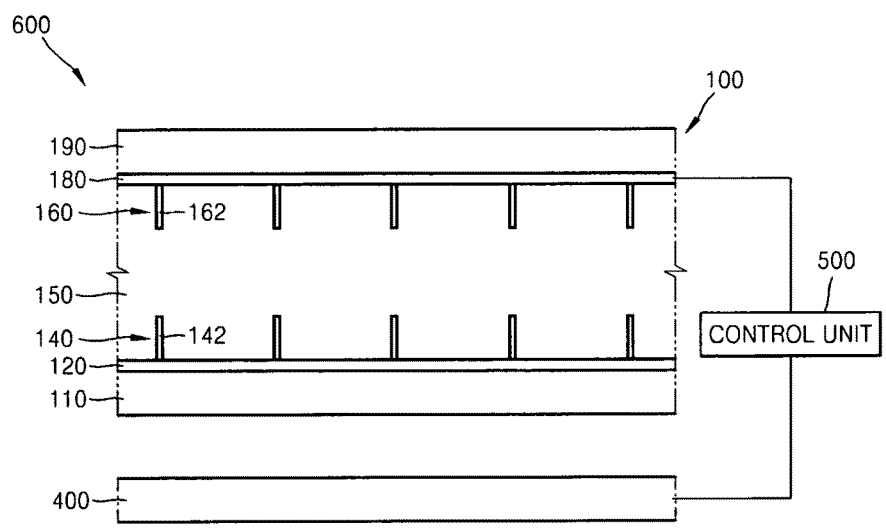
FIG. 9 is a schematic diagram of a stereoscopic image display device according to an example embodiment.

FIG. 9 is a schematic diagram of a stereoscopic image display device 600 according to an example embodiment. The stereoscopic image display device 600 includes: a display panel 400; an active lens 100; and a control unit 500. According to at least some example embodiments, the image display device 600 may be a 3D display or a 2D/3D convertible display. The image display device 600 may be an auto-stereoscopic (or non-glasses-type stereoscopic) image display device.

The display panel 400 is configured to time-sequentially display a plurality of images with different view points. For example, the display panel 400 time-sequentially displays an image for a left eye and an image for a right eye that have binocular parallax. The plurality of images may be displayed in a period shorter than the blink of an eye so as to form a single frame of an image. The display panel 400 may be any current or next generation flat panel display such as a liquid crystal display (LCD), plasma display panel (PDP), organic light emitting diode (OLED) displays, electroluminescent displays (ELDs), surface-conduction electron-emitter displays (SEDs), field emission displays (FEDs), etc.

The active lens 100 may be the same or substantially the same as the active lens 100 shown in FIG. 1. To reiterate, the active lens 100 includes: a first nanoelectrode unit 140 formed on a first substrate 110; a second nanoelectrode unit 160 formed on a second substrate 190; and a liquid crystal layer 150 disposed between the first substrate 110 and the second substrate 190. The first nanoelectrode unit 140 and the second nanoelectrode unit 160 are formed to face each other.

The liquid crystal molecules of the liquid crystal layer 150 may be aligned according to an electric field formed by a voltage or voltages applied to the first and second nanoelectrode units 140 and 160, thereby creating a refractive power. The first nanoelectrode unit 140 includes a plurality of first nanostructures 142, and the second nanoelectrode unit includes a plurality of second nanostructures 162. The first nanostructures 142 and the second nanostructures 162 may be carbon nanotubes, or nanowires that have a relatively high aspect ratio and are formed of a conductor or semiconductor material. For example, the first and second nanostructures 142 and 162 may be gold nanowires, ZnO nanowires, or Si nanowires. Alternatively, the first and second nanostructures 142 and 162 may be nanowalls or formed as fins.

Still referring to FIG. 9, the control unit 500 controls the voltage or voltages applied to the first and second nanoelectrode units 140 and 160 so that the directivity of the active lens 100 changes in synchronization with the time-sequential operation of the display panel 400. In one example, the directivity of the active lens 100 changes towards the visual fields corresponding to a plurality of images in synchronization with the time-sequential operation of the display panel 400. The control unit 500 may apply different voltages to each of the first nanostructures 142 and each of the corresponding second nanostructures 162. For example, as described with regard to FIGS. 3A and 3B, the voltages applied to each first nanostructure 142 and each second nanostructure 162 may gradually increase in a given or desired direction. In addition, the control unit 500 controls the voltage applied to the first and second nanoelectrode units 140 and 160, and such voltage distribution is repeated for each unit corresponding to each sub-pixel of the display panel 400.

Figure 10:
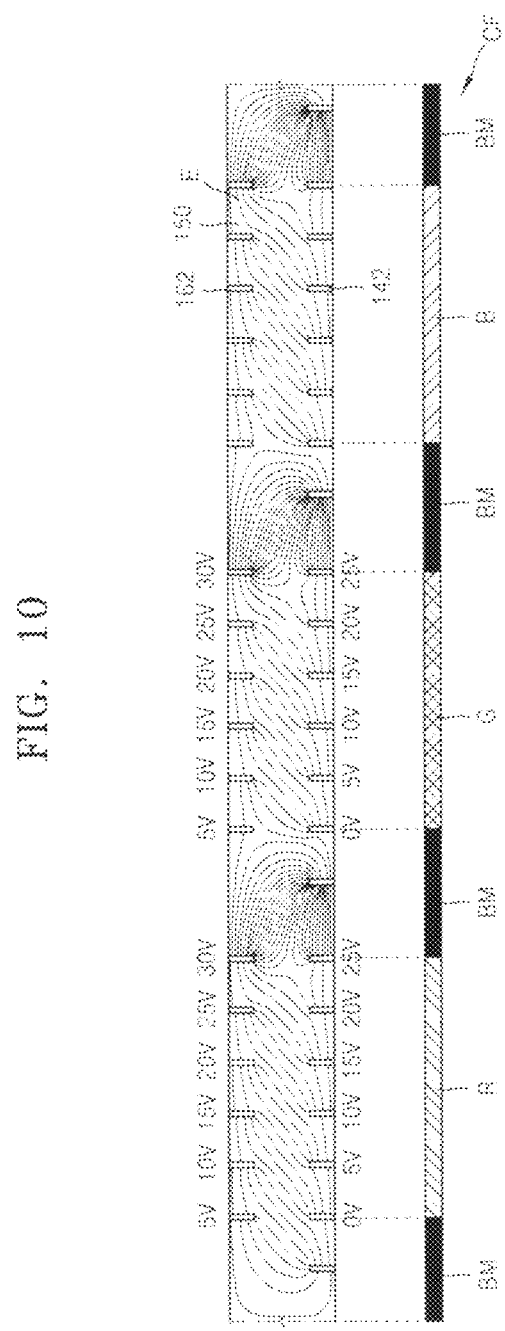
FIG. 10 illustrates an example relationship between an active lens and a pixel in the stereoscopic image display device of FIG. 9.

FIG. 10 illustrates an example relationship between the active lens and corresponding sub-pixels included in the stereoscopic image display device of FIG. 9. FIG. 10 also shows a computer simulated electric field distribution around the active lens according to the applied voltage.

As shown in FIG. 10, each sub-pixel has a corresponding active lens. In this example, the voltage applied to each of the first nanostructures 142 and the second nanostructures 162 gradually increases in a given direction. The voltage distribution is repeated for each of sub-pixels R, G and B of a color filter CF of the display panel 400. In this regard, the number of first and second nanostructures 142 and 162 included in a region corresponding to each of the sub-pixels R, G and B is not limited and may be appropriately adjusted according to image resolution. When the voltages are applied to the first and second nanostructures 142 and 162, an electric field distribution is formed as illustrated by lines of electric force in FIG. 10. As discussed above, liquid crystal molecules of the liquid crystal layer 150 are aligned along the lines of electric force to form a lens array with directivity. Black matrices (BM) are disposed between the sub-pixels R and G, between the sub-pixels G and B, and between the sub-pixels B and R. Thus, even though there are regions where an electric field is distributed in a form not contributing to the directivity of the lens, it does not affect the overall directivity of the active lens 100.

Figure 11A:
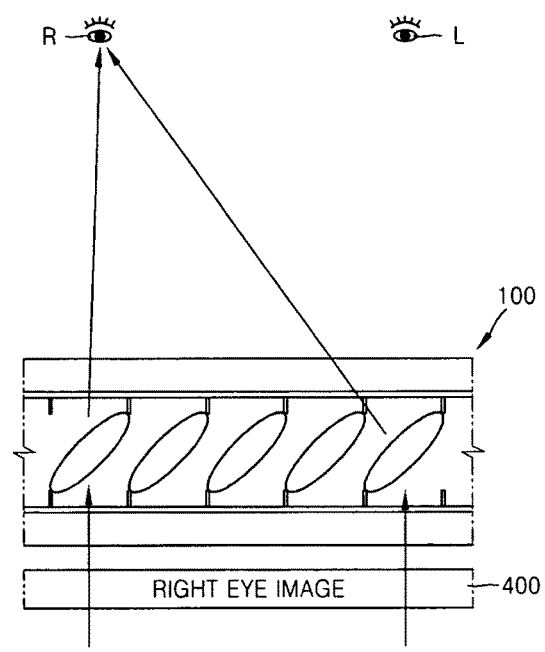
FIGS. 11A and 11B are views illustrating an example in which an image for a right eye and an image for a left eye in the stereoscopic image display device of FIG. 9 are time-sequentially displayed to the right eye and to the left eye.
Figure 11B:
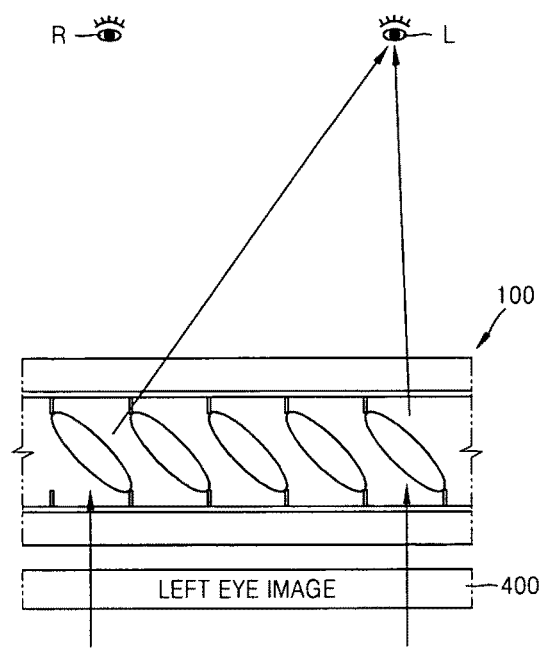

FIGS. 11A and 11B are views illustrating time-sequential display of an image for a right eye and an image for a left eye in the stereoscopic image display device of FIG. 9.

Referring to FIG. 11A, when the image for the right eye (the "right eye image") is displayed on the display panel 400, the active lens 100 is driven to have a directivity that directs the right eye image to the right eye R of the viewer.

Referring to FIG. 11B, when the image for the left eye (the "left eye image") is displayed on the display panel 400, the active lens 100 is driven to have a directivity that directs the left eye image to the left eye L of the viewer.

As shown with regard to FIGS. 11A and 11B, the right eye image and the left eye image have binocular parallax and are incident on the right eye and the left eye of the viewer, respectively. Accordingly, the viewer may realize stereoscopic images.

The stereoscopic image display device 600 described above need not include a barrier structure preventing the image for the left eye from being directed to the right eye and/or the image for the right eye from being directed to the left eye to display stereoscopic images. Thus, stereoscopic images may be formed without decreasing the resolution of the display panel 400. According to at least some example embodiments, although formation of the left eye image and the right eye image has been described, stereoscopic images with multiple view points may also be formed/displayed. For example, images from multiple directions may be time-sequentially displayed by the display panel 400, and the directivity of the active lens 100 may be adjusted corresponding thereto, thereby realizing stereoscopic images with multiple view points. If a barrier structure is used to suppress and/or prevent an image of one view point to be displayed from being directed to fields of view other than the corresponding field of view, then the resolution of the image is reduced (e.g., significantly reduced) according to increase in the number of view points. However, according to at least some example embodiments, the resolution of the images is not reduced even when stereoscopic images with multiple view points are realized.

The stereoscopic image display device 600 is described above as including the active lens 100 illustrated in FIG. 1. However, the image display device 600 may include the active lens 200 as illustrated in FIG. 4 or the active lens 300 as illustrated in FIG. 6. In one example, when the active lens 300 of FIG. 6 is used, the control unit 500 controls the voltage or voltages applied to the first and second nanoelectrode units 340 and 360 so that the directivity of the active lens 300 directs the fields of view corresponding to the plurality of images in synchronization with the time-sequential operation of the display panel 400. For example, voltage or voltages is/are selectively applied to the first nanostructures 342 and some of the second nanostructures 361-369 to direct an image displayed in the display panel 400 to the corresponding field of view, thereby forming stereoscopic images.

As described above, example embodiments provide active lenses in which nanostructures with improved and/or excellent field effects are used as electrode units to form an electric field and to control the alignment of liquid crystal molecules, thereby reducing (e.g., significantly reducing) a driving voltage for driving the active lens.

In addition, each of the nanoelectrode units includes a plurality of nanostructures, and thus, a plurality of a lens cell array may be formed more easily. Also, a voltage is selectively applied to the nanostructures of each of the nanoelectrode units, and thus the directivity and refractive power of the lens cell may be adjusted accordingly.

A stereoscopic image display apparatus including the active lens time-sequentially controls the directivity of the active lens, thereby maintaining the resolution of the display panel and realizing stereoscopic images.

Although described herein with regard to stereoscopic image display devices, active lenses according to example embodiments may be implemented or used in conjunction with camera lenses and/or zoom lenses for cameras due to their ability to control light in various ways.

At least some example embodiments enable active light modulation by electrically controlling liquid crystal molecules with nanostructures. Accordingly, example embodiments may be utilized as 2D/3D converters, active optical lenses, hologram imaging, focus adjustable lenses, etc.

It should be understood that the example embodiments described herein should be considered in a descriptive sense only and not for purposes of limitation. Descriptions of features or aspects within each example embodiment should typically be considered as available for other similar features or aspects in other example embodiments.

What is claimed is:

1. An active lens comprising:
 a first nanoelectrode unit on a first substrate;
 a second nanoelectrode unit on a second substrate, the second substrate spaced apart from the first substrate, the second nanoelectrode unit facing the first nanoelectrode unit; and
 a liquid crystal layer disposed between the first substrate and the second substrate; wherein
  liquid crystal molecules of the liquid crystal layer are aligned to form a refractive power, the liquid crystal molecules being aligned according to an electric field formed by one or more voltages applied to the first and second nanoelectrode units.

2. The active lens of claim 1, wherein the first nanoelectrode unit includes a plurality of first nanostructures and the second nanoelectrode unit includes a plurality of second nanostructures.

3. The active lens of claim 2, wherein the plurality of first and second nanostructures include at least one selected from the group including carbon nanotubes, gold nanowires, zinc oxide (ZnO) nanowires, and silicon (Si) nanowires.

4. The active lens of claim 2, wherein the plurality of first and second nanostructures include nanowalls or are formed as fins.

5. The active lens of claim 2, wherein each of the plurality of first nanostructures corresponds to one of the second nanostructures to form one or more lens cells.

6. The active lens of claim 5, wherein the plurality of first nanostructures are formed to face the plurality of second nanostructures.

7. The active lens of claim 6, wherein a first voltage applied to each of the, first nanostructures is different from a second voltage applied to a corresponding one of the second nanostructures.

8. The active lens of claim 7, wherein a different first voltage is applied to each of the first nanostructures, the magnitude of the first voltages gradually increasing in a first direction, and a different second voltage is applied to each of the second nanostructures, the magnitude of the second voltages increasing in the first direction.

9. The active lens of claim 8, wherein a difference between the first voltages applied to adjacent ones of the first nanostructures and a difference between the second voltages applied to adjacent ones of the second nanostructures is constant.

10. The active lens of claim 5, wherein each first nanostructure and corresponding second nanostructure are offset from one another.

11. The active lens of claim 1, wherein the first nanoelectrode unit includes a plurality of first nanostructures and the second nanoelectrode unit includes a plurality of nanoelectrode groups, each of the plurality of nanoelectrode groups includes a plurality of second nanostructures, wherein each of the plurality of first nanostructures corresponds to one of the plurality of nanoelectrode groups to form a plurality of lens cells.

12. The active lens of claim 11, wherein the directivity of a lens cell is adjusted by selectively applying a voltage to the plurality of second nanostructures.

13. The active lens of claim 12, further comprising:
 a control unit configured to time-sequentially change the directivity of a lens cell by applying a voltage to the plurality of second nanostructures of a nanoelectrode group corresponding to the lens cell.

14. The active lens of claim 11, wherein each of the plurality of nanoelectrode groups comprises:
 a central second nanostructure aligned with one of the plurality of first nanostructures in a straight line; and
 a plurality of second nanostructures surrounding the central second nanostructure.

15. A stereoscopic image display apparatus comprising:
 a display panel configured to time-sequentially display a plurality of images with different view points;
 the active lens of claim 1; and
 a control unit configured to change a directivity of the active lens in synchronization with the time-sequential display of the display panel.

16. The stereoscopic image display apparatus of claim 15, wherein the directivity of the active lens is changed towards visual fields corresponding to the plurality of images in synchronization with the time-sequential operation of the display panel.

17. The stereoscopic image display apparatus of claim 15, wherein the first nanoelectrode unit includes a plurality of first nanostructures and the second nanoelectrode unit includes a plurality of second nanostructures, wherein each of the plurality of first nanostructures corresponds to one of the plurality of second nanostructures to form a plurality of lens cells.

18. The stereoscopic image display apparatus of claim 17, wherein the plurality of first nanostructures face the plurality of second nanostructures.

19. The stereoscopic image display apparatus of claim 18, wherein a first voltage applied to each of the plurality of first nanostructures is different from a second voltage applied to a corresponding one of the plurality of second nanostructures.

20. The stereoscopic image display apparatus of claim 19, wherein a different first voltage is applied to each of the plurality of first nanostructures, the magnitude of the first voltages gradually increasing in a first direction, and a different second voltage is applied to each of the plurality of second nanostructures, the magnitude of the second voltages increasing in the first direction.

21. The stereoscopic image display apparatus of claim 19, wherein the display panel includes a plurality of sub-pixels, the apparatus further comprising:
 an active lens corresponding to each of the plurality of sub-pixels; wherein
  for each active lens, a different first voltage is applied to each of the plurality of first nanostructures, the magnitude of the first voltages gradually increasing in a first direction, and a different second voltage is applied to each of the plurality of second nanostructures, the magnitude of the second voltages increasing in the first direction.

22. The stereoscopic image display apparatus of claim 15, wherein the first nanoelectrode unit includes a plurality of first nanostructures and the second nanoelectrode unit includes a plurality of nanoelectrode groups, each of the plurality of nanoelectrode groups including a plurality of second nanostructures, wherein each of the plurality of first nanostructures corresponds to a plurality of second nanostructures of a nanoelectrode group to form a plurality of lens cells having directivity.

23. The stereoscopic image display apparatus of claim 22, wherein each of the plurality of nanoelectrode groups includes a central second nanostructure aligned with one of the plurality of first nanostructures, and a plurality of second nanostructures surrounding the central second nanostructure.

24. The stereoscopic image display apparatus of claim 15, wherein the first nanoelectrode unit includes a plurality of first nanostructures, the second nanoelectrode unit includes a plurality of second nanostructures, and the plurality of first and second nanostructures include at least one selected from the group including carbon nanotubes, gold nanowires, zinc oxide (ZnO) nanowires, and silicon (Si) nanowires.

25. The stereoscopic image display apparatus of claim 15, wherein the first nanoelectrode unit includes a plurality of first nanostructures, the second nanoelectrode unit includes a plurality of second nanostructures, and the plurality of first and second nanostructures include nanowalls or are formed as fins.

26. The active lens of claim 1, wherein the first nanoelectrode unit is arranged below the second nanoelectrode unit.

27. A method of operating an active lens comprising:
controlling an alignment of liquid crystal molecules of a liquid crystal layer to generate a refractive power by generating an electric field in the liquid crystal layer, the electric field being generated by applying one or more voltages to first and second nanoelectrode units arranged on opposite surfaces of the liquid crystal layer, the one or more applied voltages generating an electric field.

28. The method of claim 27, wherein the first nanoelectrode unit includes a plurality of first nanostructures, and the second nanoelectrode unit includes a plurality of second nanostructures, and wherein a first voltage applied to each of the first nanostructures is different from a second voltage applied to a corresponding one of the second nanostructures.

29. The method of claim 28, wherein a different first voltage is applied to each of the first nanostructures, the magnitude of the first voltages gradually increasing in a first direction, and a different second voltage is applied to each of the second nanostructures, the magnitude of the second voltages increasing in the first direction.

30. The method of claim 29, wherein a difference between the first voltages applied to adjacent ones of the plurality of first nanostructures and a difference between the second voltages applied to adjacent ones of the plurality of second nanostructures is constant.

31. The method of claim 27, wherein the second nanoelectrode unit includes a plurality of second nanostructures, and a directivity of the active lens is adjusted by selectively applying the one or more voltages to the plurality of second nanostructures.

32. The method of claim 31, wherein the directivity of the active lens is time-sequentially changed in synchronization with images displayed by a display panel.

33. A method of operating a stereoscopic image display apparatus including an active lens, the method comprising:
time-sequentially displaying a plurality of images with different view points; and
controlling a directivity of the active lens in synchronization with the time-sequential display by applying one or more voltages to first and second nanoelectrode units arranged on opposite surfaces of a liquid crystal layer, the one or more applied voltages generating an electric field in the liquid crystal layer, the electric field controlling an alignment of liquid crystal molecules of the liquid crystal layer to generate a refractive power.

34. The method of claim 33, wherein the first nanoelectrode unit includes a plurality of first nanostructures, and the second nanoelectrode unit includes a plurality of second nanostructures, and wherein a first voltage applied to each of the first nanostructures is different from a second voltage applied to a corresponding one of the second nanostructures.

35. The method of claim 34, wherein a different first voltage is applied to each of the plurality of first nanostructures, the magnitude of the first voltages gradually increasing in a first direction, and a different second voltage is applied to each of the plurality of second nanostructures, the magnitude of the second voltages increasing in the first direction.

36. The method of claim 35, wherein a difference between the first voltages applied to adjacent ones of the plurality of first nanostructures and a difference between the second voltages applied to adjacent ones of the plurality of second nanostructures is constant.

37. The method of claim 33, wherein the second nanoelectrode unit includes a plurality of second nanostructures, and a directivity of the active lens is adjusted by selectively applying the one or more voltages to the plurality of second nanostructures.

* * * * *